United States Patent
Heinrich et al.

(10) Patent No.: US 8,944,795 B2
(45) Date of Patent: Feb. 3, 2015

(54) MOLD RELEASE SHEET

(75) Inventors: Axel Heinrich, Aschaffenburg (DE); Halina Heidrich, Kahl am Main (DE); Alexander Bayer, Niedernberg (DE); Karsten Straube, Lutherstadt Wittenberg (DE); Peter Hagmann, Erlenbach am Main (DE); Stephan Pirl, Obernburg (DE); Jan Bernard, Niedernberg (DE); Matthias Braun, Hausen (DE)

(73) Assignee: Novartis AG, Basel (CH)

( * ) Notice: Subject to any disclaimer, the term of this patent is extended or adjusted under 35 U.S.C. 154(b) by 767 days.

(21) Appl. No.: 12/637,778

(22) Filed: Dec. 15, 2009

(65) Prior Publication Data
US 2010/0155975 A1  Jun. 24, 2010

(30) Foreign Application Priority Data

Dec. 18, 2008 (EP) .................................. 08172097

(51) Int. Cl.
B28B 7/36 (2006.01)
B29C 33/68 (2006.01)
B29C 33/38 (2006.01)
B29D 11/00 (2006.01)

(52) U.S. Cl.
CPC .......... B29D 11/00009 (2013.01); B29C 33/68 (2013.01); B29C 33/3814 (2013.01)
USPC ........................................................ 425/89

(58) Field of Classification Search
USPC .......................................... 264/1.32; 425/89
See application file for complete search history.

(56) References Cited

U.S. PATENT DOCUMENTS

| 4,038,014 | A |   | 7/1977  | Dusza           |
|-----------|---|---|---------|-----------------|
| 4,540,532 | A | * | 9/1985  | Petcen et al. ........ 264/1.1 |
| 4,640,489 | A |   | 2/1987  | Larsen          |
| 4,955,580 | A |   | 9/1990  | Seden           |
| 4,985,186 | A |   | 1/1991  | Nose            |
| 5,141,783 | A |   | 8/1992  | Corsi           |
| 5,143,660 | A |   | 9/1992  | Hamilton        |
| 5,508,317 | A |   | 4/1996  | Müller          |
| 5,540,410 | A |   | 7/1996  | Lust            |
| 5,573,108 | A |   | 11/1996 | Hamilton        |
| 5,583,163 | A |   | 12/1996 | Müller          |
| 5,753,150 | A |   | 5/1998  | Martin          |

(Continued)

FOREIGN PATENT DOCUMENTS

| DE | 197 31 780 A1 |   | 1/1999 |
|----|---------------|---|--------|
| EP | 0 665 584 A1  |   | 8/1995 |
| EP | 0985520       | * | 3/2000 |

OTHER PUBLICATIONS

European Search Report dated Jun. 2, 2009.

(Continued)

*Primary Examiner* — Larry Thrower
(74) *Attorney, Agent, or Firm* — Robert A. Ambrose

(57) ABSTRACT

The present invention relates to a mold half for making an ophthalmic lens, in particular a contact lens, wherein the mold half comprises a release sheet removably arranged on the mold surface of said mold half to separate a lens forming material from the mold surface, as well as to a method for applying a removable mold release sheet to said mold half. The mold half of the invention comprises a vacuum means to removably attach said release sheet to said mold surface, and preferably the mold half further comprises a pinch-off rim for forming the edge of said ophthalmic lens.

12 Claims, 19 Drawing Sheets

(56) References Cited

U.S. PATENT DOCUMENTS

| | | |
|---|---|---|
| 5,760,100 A | 6/1998 | Nicolson |
| 5,782,460 A | 7/1998 | Kretzschmar |
| 5,789,464 A | 8/1998 | Müller |
| 5,849,810 A | 12/1998 | Müller |
| 5,894,002 A | 4/1999 | Boneberger |
| 6,207,090 B1 | 3/2001 | Knisely |
| 6,315,929 B1 | 11/2001 | Ishihara |
| 6,407,145 B1 | 6/2002 | Müller |
| 6,565,776 B1 | 5/2003 | Li |
| 6,800,225 B1 | 10/2004 | Hagmann |
| 6,881,269 B2 | 4/2005 | Matsuzawa |
| 6,913,715 B2 | 7/2005 | Li |
| 7,641,845 B2 | 1/2010 | Chang |
| 2003/0230817 A1 | 12/2003 | Crook |
| 2004/0222539 A1 | 11/2004 | Hagmann |
| 2007/0132135 A1* | 6/2007 | Takase et al. .......... 264/157 |
| 2008/0251973 A1 | 10/2008 | Chang |

OTHER PUBLICATIONS

PCT International Search Report dated Apr. 19, 2010 for International Application No. PCT/EP2009/067199, International Filing Date Dec. 15, 2009.

PCT Written Opinion of the International Searching Authority dated Apr. 19, 2010 for International Application No. PCT/EP2009/067199, International Filing Date Dec. 15, 2009Dated—Apr. 19, 2010.

* cited by examiner

MOLD RELEASE SHEET

This application claims benefit under 35 U.S.C. §119 of European Patent Application No. 08172097.1, filed on Dec. 18, 2008, the contents of which are incorporated herein by reference in its entirety.

The present invention relates to a mold half comprising a release sheet removably arranged on the mold surface of said mold half to separate the lens forming material from the mold surface, as well as to a mold assembly comprising a pair of mold halves wherein at least one, preferably both, of said mold halves comprise a release sheet removably arranged on the mold surface of said mold half. The invention further relates to methods for applying a removable mold release sheet to a mold half, as well as to a process for the manufacture of a contact lens, making use of a mold half and/or a mold assembly as described above.

BACKGROUND

Ophthalmic lenses, in particular contact lenses, which it is intended to produce economically in large numbers, are preferably produced by the so-called mold or full-mold process. In this process, the lenses are produced in their final shape between two mold halves, so that neither subsequent machining of the surfaces of the lenses nor machining of the edge is necessary. Mold processes are described, for example in WO-A-87/04390, EP-A-0367513 or in U.S. Pat. No. 5,894, 002.

In the known molding processes, the geometry of the contact lens to be produced is defined by the mold cavity between the two lens forming areas of the mold halves. The edge of the contact lens is likewise formed by the mold, whereby the geometry of the edge is defined by the contour of the two mold halves in the region in which they make contact with each other or by the spatial limitation of the UV light used for cross-linking the lens forming material.

In order to produce a contact lens, usually a specific amount of a flowable lens forming material is introduced into the female mold half in a first step. The mold is then closed by putting the male mold half into place. The subsequent polymerization and/or cross-linking of the lens forming material is carried out by means of irradiation with UV light and/or by heating. In the process, either both the lens forming material in the mold cavity and the excess material in the overflow are hardened or only the lens forming material in the mold cavity is hardened, whereas the excess material in the overflow remains as "flash". In order to obtain fault-free separation of the contact lens from the excess material, good sealing or expulsion of the excess material must be achieved in the zone in which the two mold halves make contact with each other or which defines the spatial limitation of the UV light used for cross-linking the lens forming material.

After the lens if formed, the mold is disassembled and the lens removed. Additional processing steps, such as inspection, extraction, hydration, surface treatment and sterilization may finally be performed on the lens before packaging.

The materials used for the molds in the above described processes are preferably glass or quartz.

EP-A-0985520 discloses a mold assembly for forming an ophthalmic lens, comprising a first mold and a second mold which cooperate with each other to define therebetween a mold cavity having a profile following that of the ophthalmic lens, characterized in that: at least one of the first and second molds is a coated mold consisting of a body portion including a backing surface having rigidity and mechanical strength enough to withstand a molding operation for forming the ophthalmic lens in the mold cavity, and a thermoplastic film retained on the body portion such that the thermoplastic film covers the backing surface of the body portion, the thermoplastic film having a molding surface which partially defines the mold cavity and which gives a corresponding one of opposite surfaces of the ophthalmic lens.

DE-A-19731780 discloses a process for manufacturing sensitive components, such as lenses or micro devices, wherein in the process a film is placed onto a tool insert, the component is molded onto the film between the two mold halves, i.e. the tool insert, respectively, and the film is demolded with the component adhering to it. In a preferred embodiment, the tool insert further comprises a pinch-off rim to cut of the gate, when the mold halves are closed and the film is compressed by the two mold halves, i.e. the tool insert, respectively.

U.S. Pat. No. 4,038,014 discloses a mold for forming a lens blank with a thickness of from 0.75 to 1 mm under applied heat to meniscus shape, by applying a force created by vacuum. The vacuum preferably is applied through a central hole in the mold. Further, in between the lens blank and the shaping surface, a rubber cushion or synthetic fabric is provided, which allegedly is effecting improved accuracy in lens blank conformance to the shaping surface, improved surface smoothness and improved release upon completion of a forming cycle.

US-A-2007/0132135 discloses and apparatus and method for manufacturing optical electronic components, wherein a transparent resin, e.g. epoxy resin or silicone resin, is applied to protect an optical device as well as to act as a lens. In particular, the apparatus comprises a molding cavity and a mold release film, as well as a vacuum pump to attract the mold release film towards the cavity's entire surface. The mold release film is disclosed to have excellent heat resistance and durability to cover the mold cavity during the molding process.

U.S. Pat. No. 4,540,532 discloses a mold assembly and method, for making a molded polymeric article having a predetermined shape, comprising an envelope completely encasing a quantity of a liquid polymerizable monomer mixture, the envelope being characterized in that it is flexible at room temperature, essentially impermeable to oxygen, and chemically inert to said mixture, and a mold means, including a pair of mold halves disposed on opposing sides of the envelope, for forcing the envelope and its contents to conform to the inner surfaces of both mold halves. As FIG. 1 of U.S. Pat. No. 4,540,532 shows, a polymerizable monomer mixture 10 is sealed into an envelope 11. As shown in FIG. 2 of U.S. Pat. No. 4,540,532 said monomer mixture is polymerized within the sealed envelope while it is in a mold 20, comprising a pair of mold faces 21 and 22 exerting pressure on the envelope.

The mold assembly and method of the prior art has two major drawbacks:
(1) It is difficult to first form the envelope, then introduce the liquid polymerizable monomer mixture into the envelope outside the mold halves, sealing the envelope and only then transferring the envelope to the mold halves for making the molded polymeric article. Further, such a multi-step procedure adds complexity to an industrial scale manufacturing process, which finally makes it time consuming and costly.
(2) It is difficult to control the pressure between the mold halves in such a way, that the envelope sufficiently conforms to the inner surfaces of both mold halves, and at the same time not to apply excessive pressure that ruptures the envelope. In particular the sealing of the envelope is prone to rupture under excessive pressure, leading to spill-out of the liquid polymerizable monomer mixture onto the surface of the mold halves.

Accordingly, it is an object of the present invention to provide an improved mold half and mold assembly, as well as methods allowing for an industrial scale manufacturing process of molded articles with limited complexity (i.e. less handling steps) and at low cost.

It is a further object of the present invention to provide an improved mold half and mold assembly, as well as methods effectively protecting the mold surface of one or both mold halves from contact with the material forming the polymeric article at all time during manufacturing of the molded polymeric article, in particular avoiding a complex control of mold pressure.

It is still a further object of the present invention to provide an improved mold half and mold assembly, as well as methods for reproducibly conforming a mold release sheet to the contour of the lens forming area of a mold half, for manufacturing lenses with a good optical quality and at the same time a good edge quality.

It is still a further object of the present invention to provide a process for the manufacture of a contact lens, making use of a mold half and/or a mold assembly as described above.

SUMMARY OF THE INVENTION

These objects are achieved by a mold half, a mold assembly as well as the methods according to the independent claims. Further embodiments of the mold half, the mold assembly as well as of the methods according to the invention are defined in the respective dependent claims.

DEFINITIONS

Figure 1:
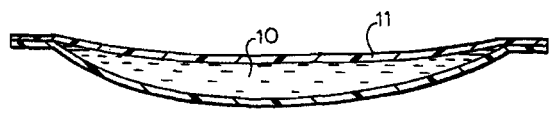
FIG. 1 is a an envelope sealing a monomer mixture according to the disclosure of the prior art U.S. Pat. No. 4,540,532.

A mold half is a part of a mold assembly for forming an ophthalmic lens, in particular a contact lens, preferably in the so-called mold or full-mold process. The mold half comprises at least a body part as well a lens forming area, wherein in general the lens forming area for a male mold half has a convex shape and the lens forming area for a female mold half has a concave shape. When assembled to a mold assembly, the mold halves form a lens shaped mold cavity between the male and female lens forming area.

A release sheet is a sheet or film, which is removably arranged on or attached to at least the lens forming area of a mold half. A release sheet is generally made from an organic polymeric material, has a smooth surface, a high elasticity, sufficient mechanical stability, is inert to the reactions of the lens forming material, has a limited adhesion to the formed lens as well as to the mold surface, and preferably has a high UV transmittance as well as a high resistance to UV irradiation.

Removably arranged on, in terms of the invention, means a positioning of the release sheet in close proximity to or in contact with the mold surface, in particular the lens forming area. In general the release sheet is thereby only held in its position through mechanical means.

Removably attached to, in terms of the invention, means a fixation of the release sheet in direct contact with the mold surface, in particular the lens forming area. In general the release sheet is fixed to the surface through physical forces only. However, embodiments of the invention are conceivable wherein the fixation may be supported by chemical means, such as adhesives.

Tightly conforms to the contour, in terms of the invention, means fully and smoothly covering the respective underlying surface, i.e. without any breaks, folds or tears, as well as maintaining all relevant features of the underlying surface within a defined threshold and reproducing those features to the respective molded article in the molding process.

Extends substantially beyond, in terms of the invention, means extending to an area outside the lens forming area, in particular to the mold surface area which does not form the lens. In general extending substantially beyond corresponds to an area which has a size of 150% or more, preferably 200% or more and more preferably 500% or more, compared to the size of the lens forming area alone (100%). Said area outside the lens forming area may comprise an area indicated as the release sheet support area or the entire mold surface, as well as an area indicated as the distance ring.

A vacuum means in terms of the invention generally comprises any means that is suitable to hold a release sheet attached to a mold surface through the use of a difference in pressure on the one side of the release sheet compared to the other side of the release sheet. Preferred vacuum means are vacuum holes in fluid connection with a vacuum line, ring gaps in fluid connection with a vacuum line as well as porous surfaces in fluid connection with a vacuum line, applying a vacuum to the bottom surface of the release sheet, i.e. the opposite surface to the one in contact with the lens forming material. However, embodiments of the invention are conceivable wherein there is a higher pressure applied to the top surface of the release sheet instead of a vacuum applied to the bottom surface. Such embodiments are explicitly comprised by the technical teaching of the present invention.

A pinch-off rim may generally be described as a protrusion on either the male or the female mold half or on both mold halves, wherein the dimension of the protrusion corresponds to the desired distance of the two mold halves in the closed position. Said distance preferably takes into account the thickness of the mold release sheet in single or double layer, more preferably allowing for some compression of the mold release sheet in single or double layer.

DETAILED DESCRIPTION OF EMBODIMENTS

Figure 2:
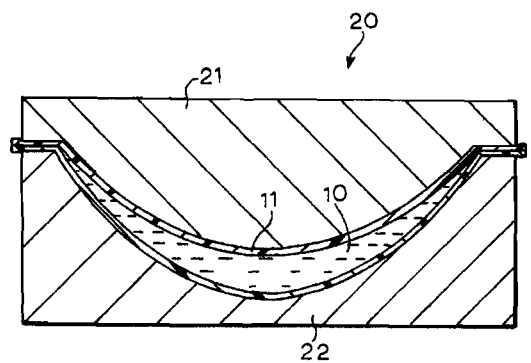
FIG. 2 is a mold, holding an envelope of FIG. 1.

FIGS. 1 and 2 are embodiments of the prior art. FIG. 1 is showing an envelope 11 sealing a polymerizable monomer mixture 10. In FIG. 2 said monomer mixture is polymerized within the sealed envelope while it is in a mold 20, comprising a pair of mold faces 21 and 22 exerting pressure on the envelope.

In one aspect, the present invention is directed to a mold half comprising a release sheet removably arranged on the mold surface of a mold half to separate the lens forming material from the mold surface.

Figure 3:
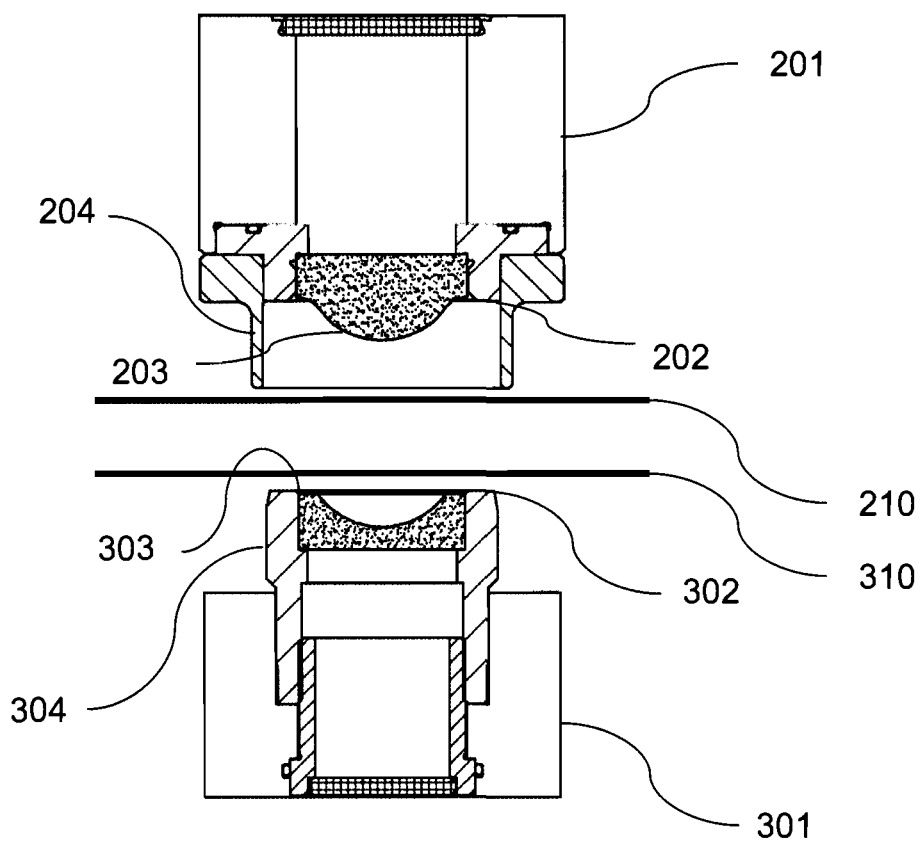
FIG. 3 is an embodiment of a mold assembly according to the invention showing a first step in a method of applying a removable mold release sheet to the mold halves.

FIG. 3 shows an embodiment of an open mold assembly according to the present invention comprising a male mold half 201 and a female mold half 301, wherein each mold half has a mold surface (male mold surface 202, female mold surface 302) having a lens forming area, wherein the male lens forming area 203 has a convex surface and the female lens forming area 303 has a concave surface. The mold release sheets 210, 310 are shown above the mold surface of the respective mold half. Optionally the mold assembly comprises a centering device, which in FIG. 3 is formed by a centering case 204 and the respective counter bearing 304.

Figure 4:
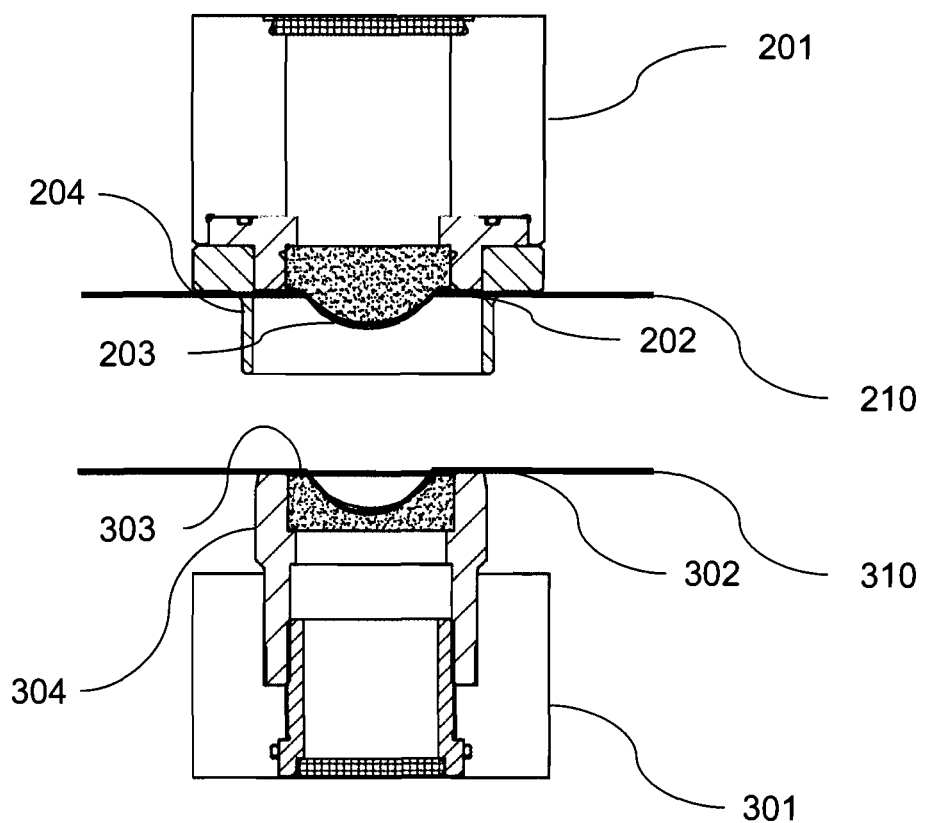
FIG. 4 is a mold assembly of FIG. 3 showing a second step in the method of applying a removable mold release sheet to the mold halves.

In FIG. 4, an open mold assembly of FIG. 3 is shown, wherein the mold release sheets 210, 310 are conformed to the respective mold surface, in particular in the lens forming area, wherein the one mold release sheet 210 is conformed to the convex surface 203 of the male mold half 201 and the other mold release sheet 310 is conformed to the concave surface 303 of the female mold half 301.

Figure 5:
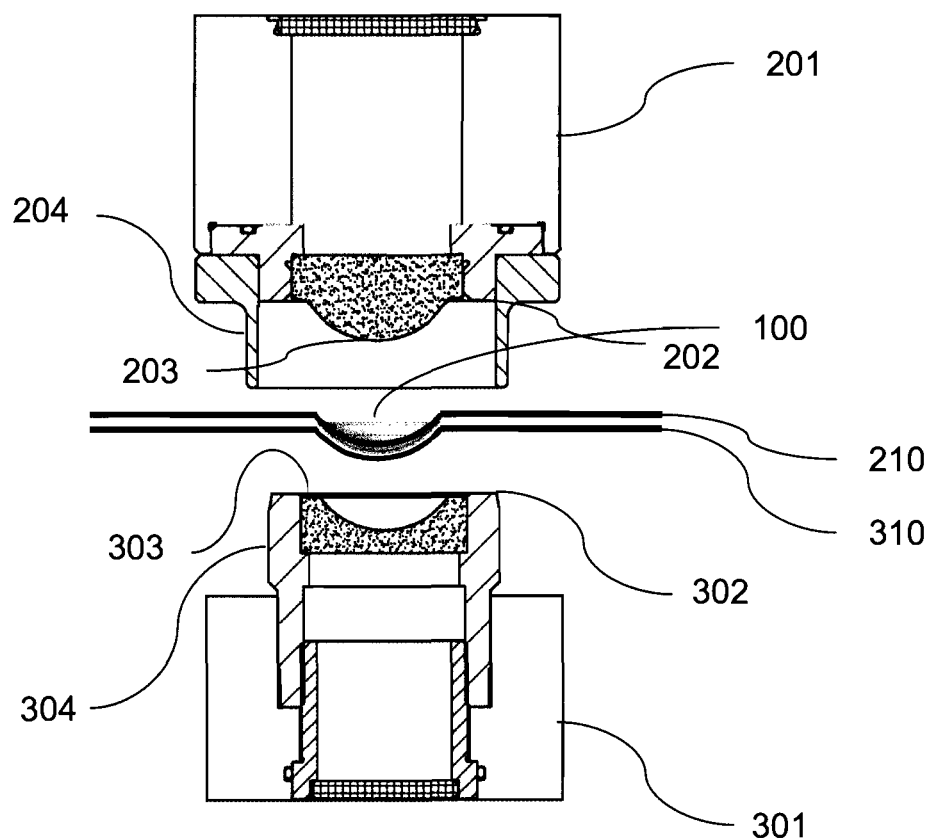
FIG. 5 is a schematic representation of a contact lens formed with and removed from a mold assembly of FIGS. 3 and 4.

In FIG. 5, after a molding process in a closed mold assembly of FIGS. 3 and 4, both mold release sheets 210 and 310 are removed from the mold surfaces of the open mold assembly. The formed contact lens 100 is shown schematically between the two mold release sheets 210 and 310.

In another aspect, the present invention is directed to a method for conforming a mold release sheet to the surface of a respective mold half.

Figure 6:
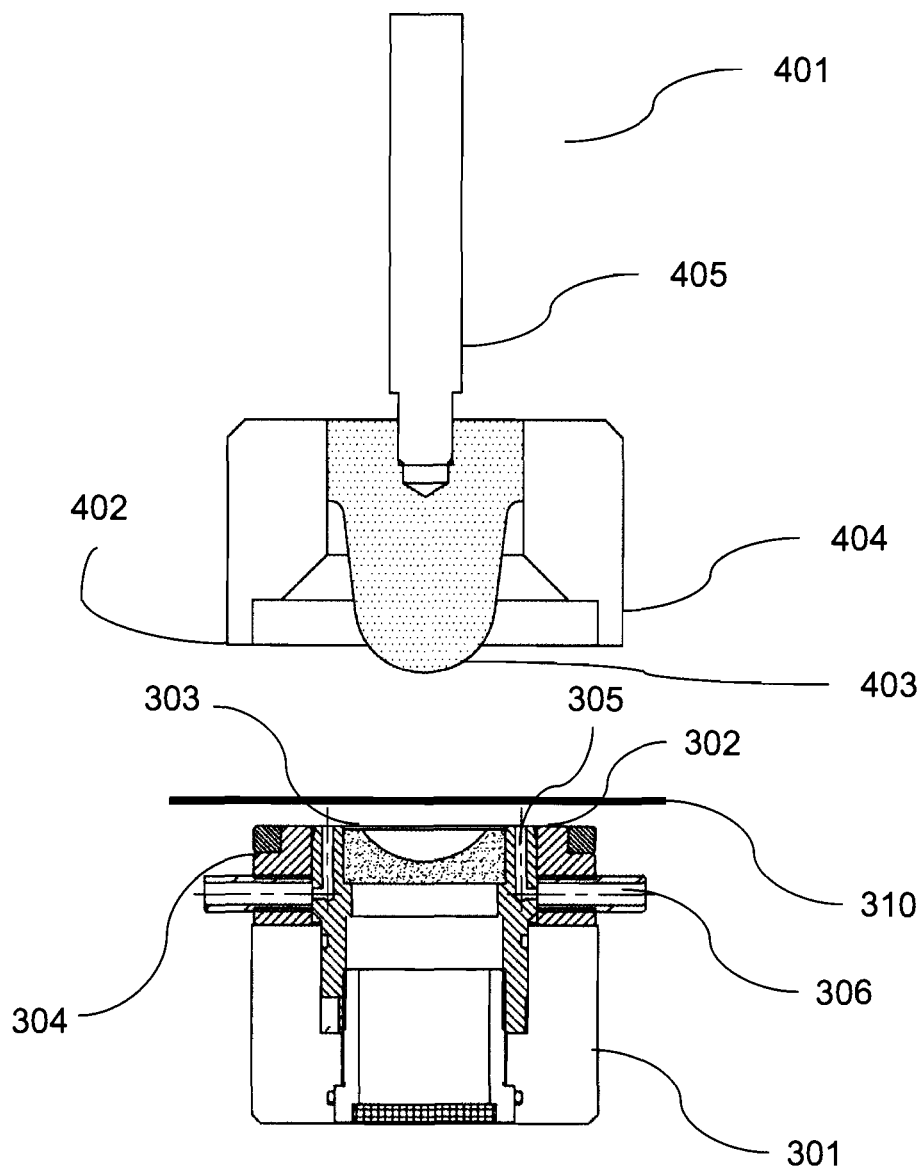
FIG. 6 is an embodiment of a female mold half according to the invention and a device for applying a removable mold release sheet to a concave lens forming area.
Figure 7:
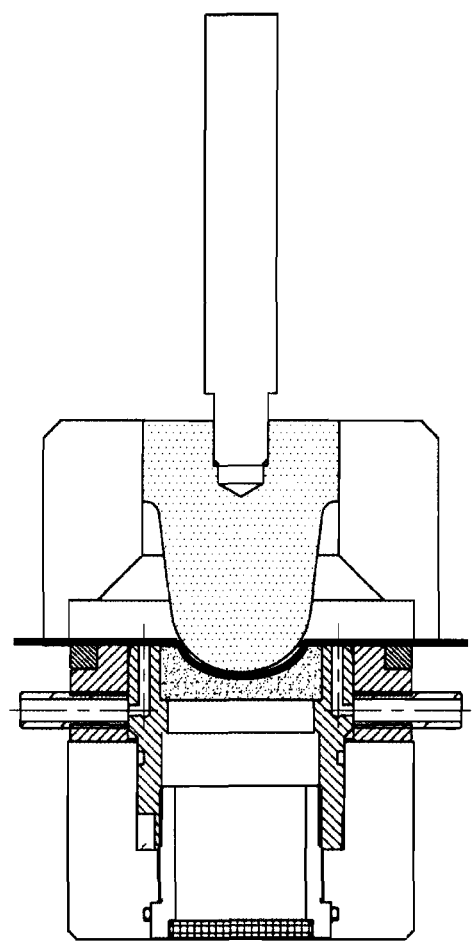
FIG. 7 is a schematic representation of a second step in a method for applying a removable mold release sheet to a concave lens forming area with a device of FIG. 6.

In FIGS. 6 and 7 one conceivable method for conforming a mold release sheet 310 to the concave lens forming area 303 of a female mold half 301 is shown. In a first step, the mold release sheet is positioned above the mold surface of the mold half. In a second step (as shown in FIG. 7) a pad 403 is conforming the mold release sheet 310 to the lens forming area 303 and, optionally, as well to the mold surface 302. The pad 403 preferably has the shape of the mold forming area and more preferably is made of an elastic material. The stamp tool 401 comprises a piston 405 to which the pad 403 is attached. Optionally the stamp tool further comprises a case 404 and a spacer 402, which may act as a centering device as well as a distance device, e.g. using the counter bearing 304 for centering and the release sheet support 302 as counter bearing for the distance.

In FIG. 6 the female mold half 301 in a preferred embodiment further comprises vacuum holes 305 circumferentially surrounding the lens forming area 303, as well as a vacuum line 306, through which vacuum may be applied for conforming the release sheet to the contour of the lens forming area.

Figure 8:
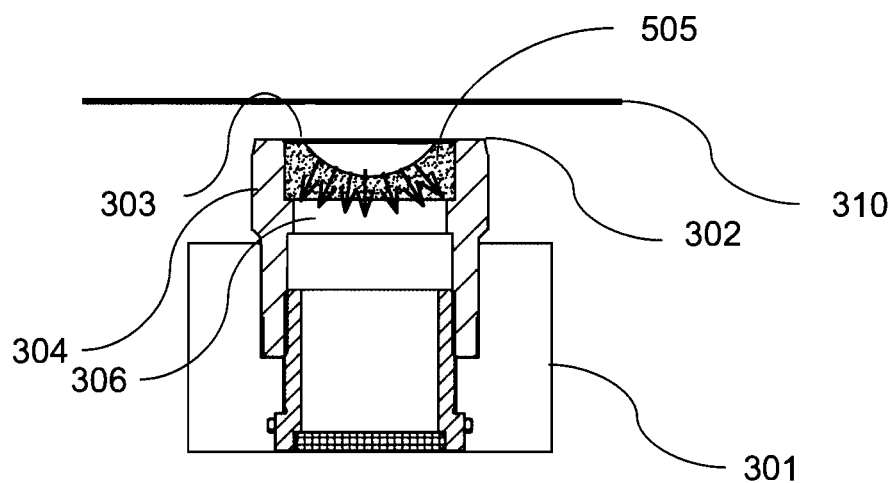
FIG. 8 is an embodiment of a female mold half according to the invention and a schematic representation of a first step in an alternative method for applying a removable mold release sheet to a concave lens forming area.
Figure 9:
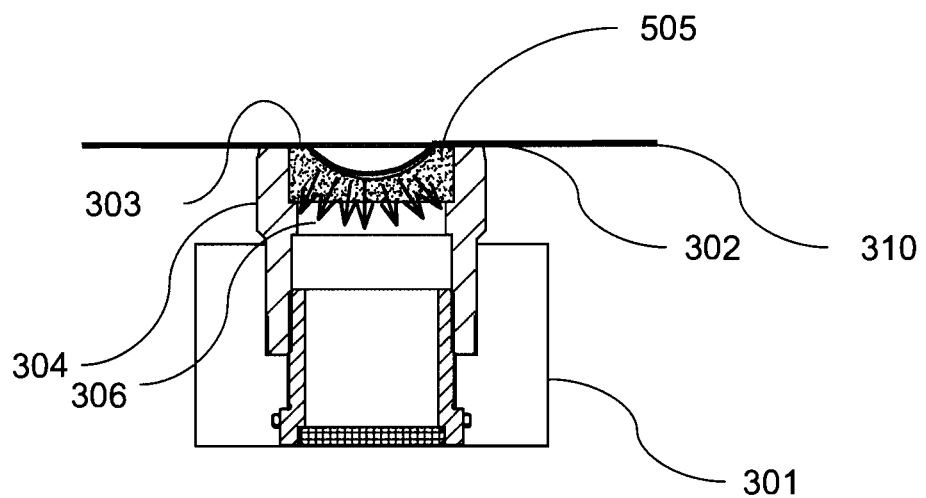
FIG. 9 is a schematic representation of a second step in the method of FIG. 8.

In FIGS. 8 and 9 another conceivable method for conforming the mold release sheet 310 to the concave lens forming area 303 of the female mold half 301 is shown. In a first step, the mold release sheet is positioned above the mold surface 302 of the mold half, wherein the lens mold is (at least partly) constituted of a porous body 505, which is in fluid connection with a vacuum line 306. In a second step (as shown in FIG. 9) vacuum is applied to the vacuum line 306 for conforming the mold release sheet to the lens forming area 303 of the mold half 301. The porous body 505 preferably is made of microporous polyethylene with a pore size of for example 10 μm, but may be made of any suitable porous material providing a surface quality sufficient for forming an optical surface of a contact lens. The porous body is held in a suitable mold case.

Figure 10:
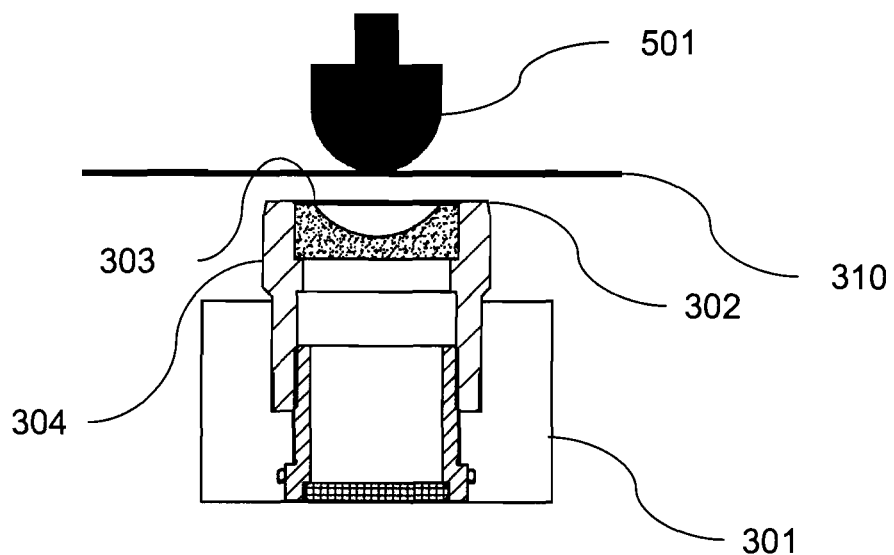
FIG. 10 is an embodiment of a female mold half according to the invention and a schematic representation of a first step in a further alternative method for applying a removable mold release sheet to a concave lens forming area.
Figure 11:
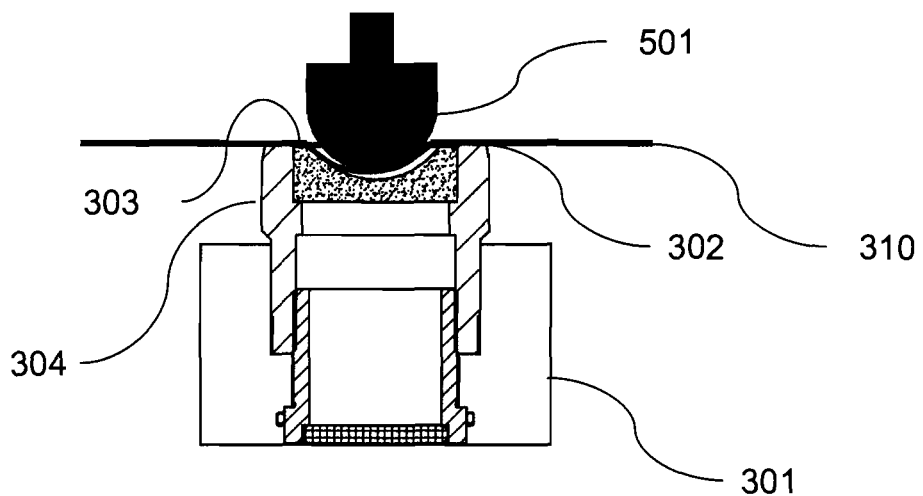
FIG. 11 is a schematic representation of a second step in the method of FIG. 10.

In FIGS. 10 and 11 a further conceivable method for conforming the mold release sheet 310 to the concave lens forming area 303 of the female mold half 301 is shown. In a first step, the mold release sheet is positioned above the mold surface 302 of the mold half. In a second step (as shown in FIG. 11) a heat stamp or heat source 501 is applied to the mold release sheet 310 for conforming the mold release sheet to the lens forming area 303 of the mold half 301. The heat source preferably is a commercially available Infrared source (IR source), but may be any suitable heat source providing defined and proportioned heat sufficient for conforming a mold release sheet.

Figure 12:
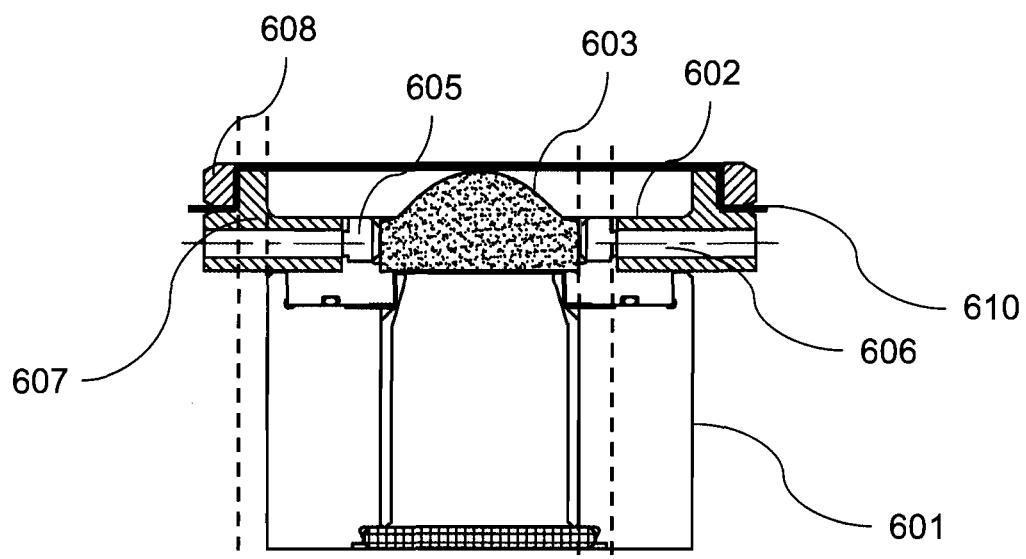
FIG. 12 is an embodiment of a male mold half according to the invention comprising vacuum holes circumferentially surrounding the lens forming area.

FIG. 12 shows an embodiment of a male mold half 601 according to the present invention (cut side view) comprising a mold surface 602, a lens forming area 603 with a convex surface. The mold release sheet 610 is shown above the mold surface of the mold half and is fixed to the mold half between a distance ring 607 and a clamping ring 608. The mold half 601 further comprises vacuum holes 605 circumferentially surrounding the lens forming area 603, as well as a vacuum line 606, through which vacuum may be applied for conforming the release sheet to the contour of the lens forming area.

Figure 13:
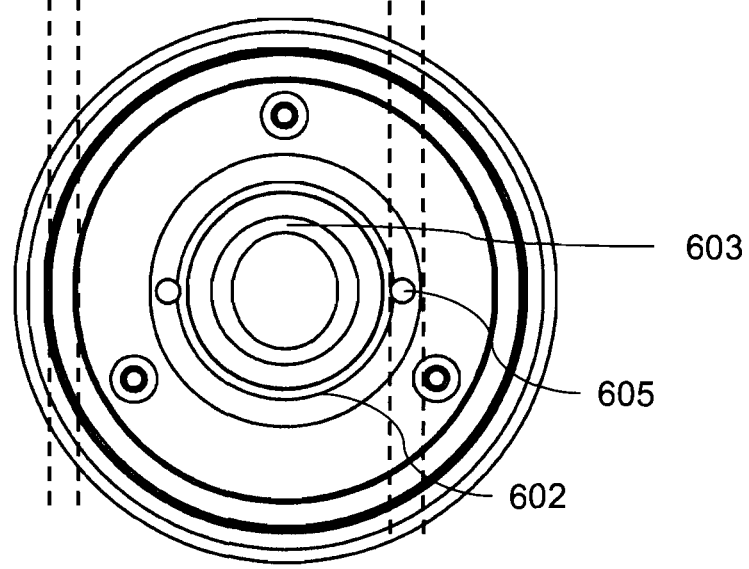
FIG. 13 is a top view of the embodiment according to the invention of FIG. 12.

FIG. 13 shows a top view of the mold half of FIG. 12, wherein the position of the distance ring 607 and clamping ring 608 as well as the position of the vacuum holes 605 are indicated with regard to FIG. 12 in dashed lines.

Figure 14:
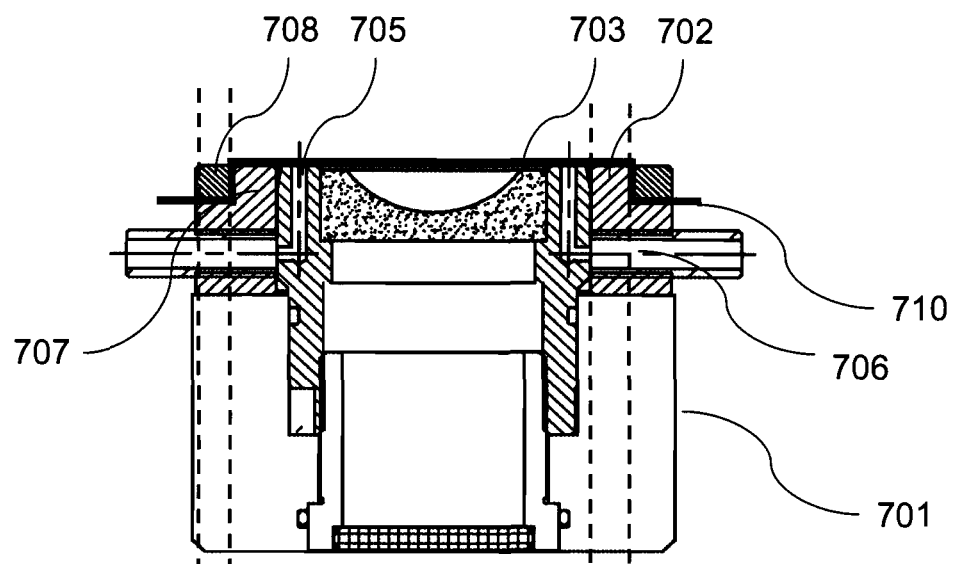
FIG. 14 is an embodiment of a female mold half according to the invention comprising vacuum holes circumferentially surrounding the lens forming area.

FIG. 14 shows an embodiment of a female mold half 701 according to the present invention (cut side view) comprising a mold surface 702, a lens forming area 703 with a concave surface. The mold release sheet 710 is shown above the mold surface of the mold half and is fixed to the mold half between a distance ring 707 and a clamping ring 708. The mold half 701 further comprises vacuum holes 705 circumferentially surrounding the lens forming area 703, as well as a vacuum line 706, through which vacuum may be applied for conforming the release sheet to the contour of the lens forming area.

Figure 15:
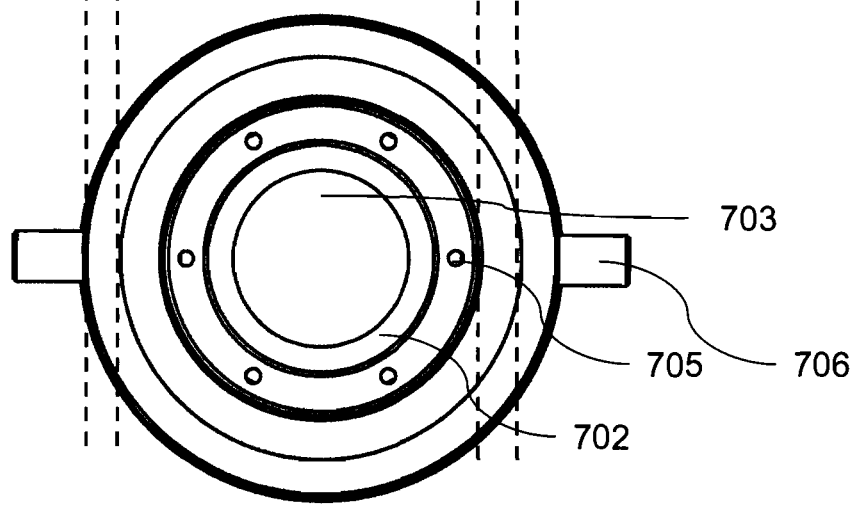
FIG. 15 is a top view of the embodiment according to the invention of FIG. 14.

FIG. 15 shows a top view of the mold half of FIG. 14, wherein the position of the distance ring 707 and clamping ring 708 are indicated with regard to FIG. 14 in dashed lines.

Figures 16, 17:
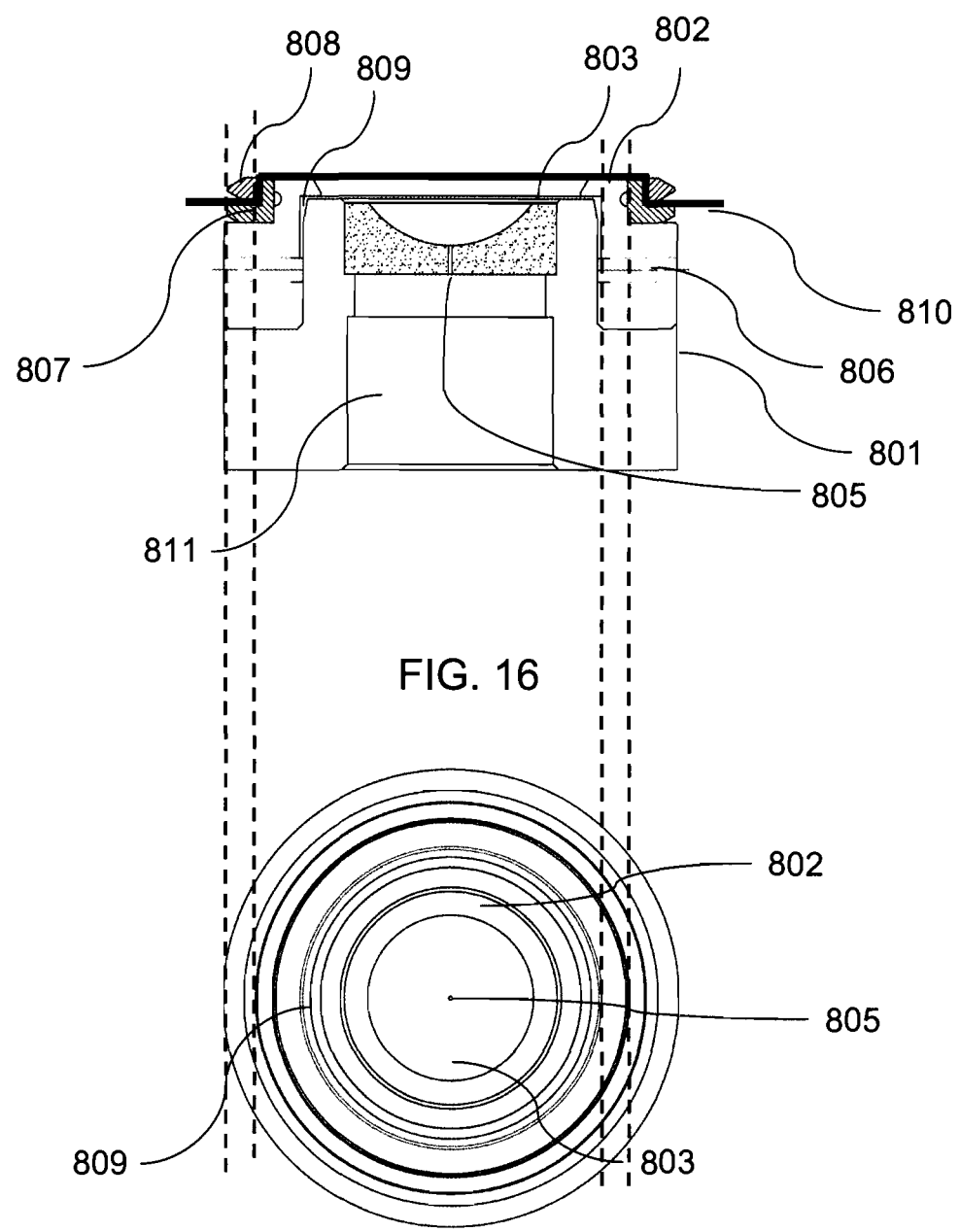
FIG. 16 is an embodiment of a female mold half according to the invention comprising a vacuum hole centrally arranged in the lens forming area.
FIG. 17 is a top view of the embodiment according to the invention of FIG. 16.

FIG. 16 shows an embodiment of a female mold half 801 according to the present invention (cut side view) comprising a mold surface 802, a lens forming area 803 with a concave surface. The mold release sheet 810 is shown above the mold surface of the mold half and is fixed to the mold half between a distance ring 807 and a clamping ring 808. The mold half 801 further comprises a ring gap 809 circumferentially surrounding the lens forming area 803, as well as a first vacuum line 806, through which vacuum may be applied to said ring gap for conforming the release sheet to the contour of the lens forming area. The mold half 801 further comprises a vacuum hole 805 centrally arranged in the lens forming area 803, as well as a second vacuum line 811, through which vacuum may be applied to said vacuum hole for conforming the release sheet to the contour of the lens forming area.

FIG. 17 shows a top view of the mold half of FIG. 16, wherein the position of the distance ring 807 and clamping ring 808 are indicated with regard to FIG. 16 in dashed lines.

Figure 18:
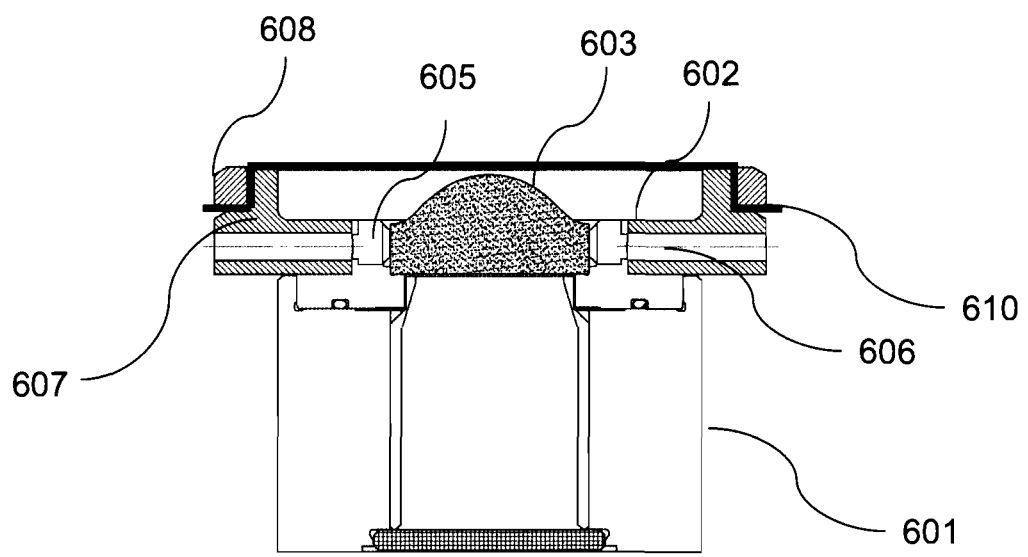
FIG. 18 is an embodiment of a male mold half according to the invention and a schematic representation of a first step in a method for applying a removable mold release sheet to a convex lens forming area.
Figure 19:
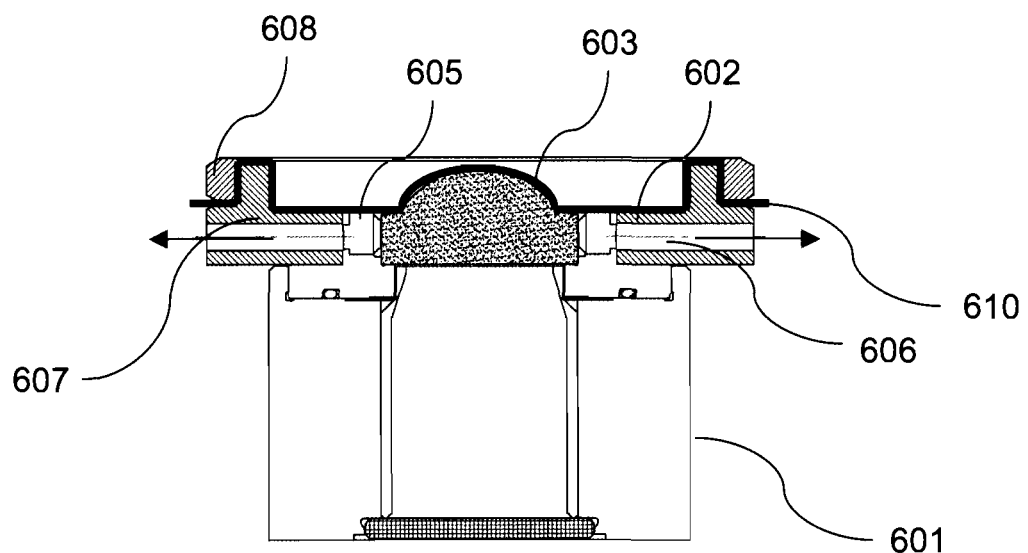
FIG. 19 is a schematic representation of a second step in the method of FIG. 18.

In FIGS. 18 and 19 one conceivable method for conforming a mold release sheet 610 to the convex lens forming area 603 and release sheet support 602 of a male mold half 601 as of FIGS. 12 and 13 is shown. In a first step, the mold release sheet is positioned above the mold surface of the mold half and fixed to the mold half between a distance ring 607 and a clamping ring 608. In a second step (as shown in FIG. 19) vacuum is applied through the vacuum line 606 to the vacuum holes 605 for conforming the mold release sheet to the lens forming area 603 as well to the release sheet support 602 of the male mold half 601.

Figure 20:
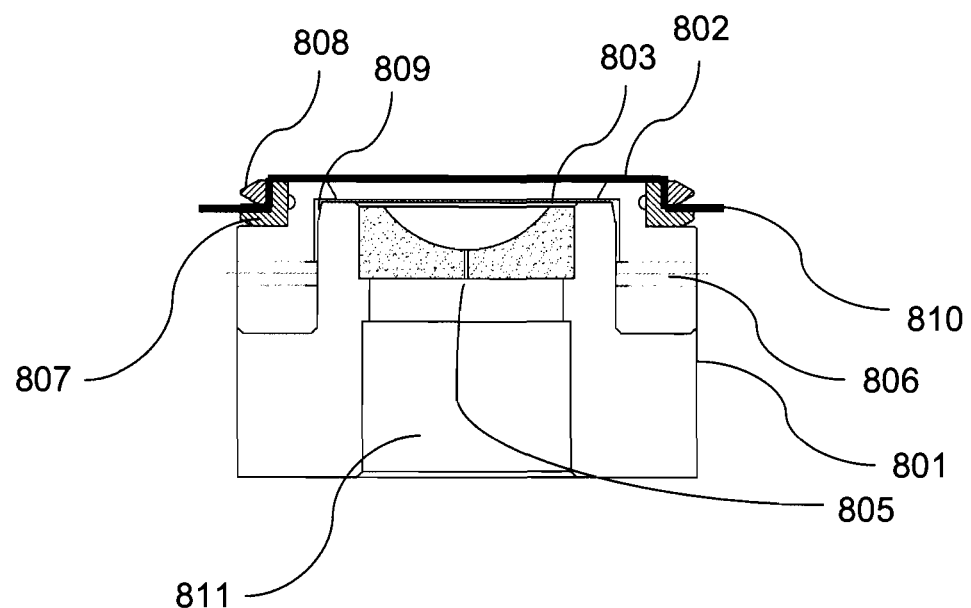
FIG. 20 is an embodiment of a female mold half according to the invention and a schematic representation of a first step in a method for applying a removable mold release sheet to a concave lens forming area.
Figure 21:
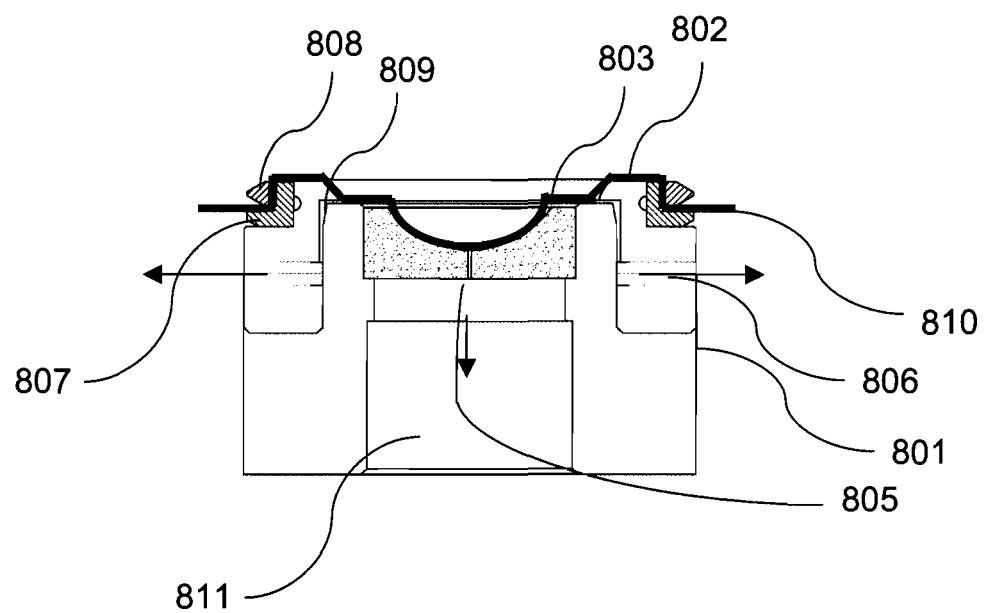
FIG. 21 is a schematic representation of a second step in the method of FIG. 20.

In FIGS. 20 and 21 one conceivable method for conforming a mold release sheet 810 to the concave lens forming area 803 and release sheet support 802 of a female mold half 801 as of FIGS. 16 and 17 is shown. In a first step, the mold release sheet is positioned above the mold surface of the mold half and fixed to the mold half between a distance ring 807 and a clamping ring 808. In a second step (as shown in FIG. 21) vacuum is applied through the vacuum line 806 to the ring gap 809 as well as through the second vacuum line 811 to the vacuum hole 805 for conforming the mold release sheet to the lens forming area 803 as well to the release sheet support 802 of the female mold half 801. In one alternative, the vacuum may be applied to the vacuum lines 806 and 811 at the same time, whereas in another alternative the vacuum may be applied to the vacuum lines 806 and 811 in a sequential manner. It is conceivable, to first apply vacuum to vacuum line 806 and then to 811, as well as to first apply vacuum to line 811 and then to 806.

Figure 22:
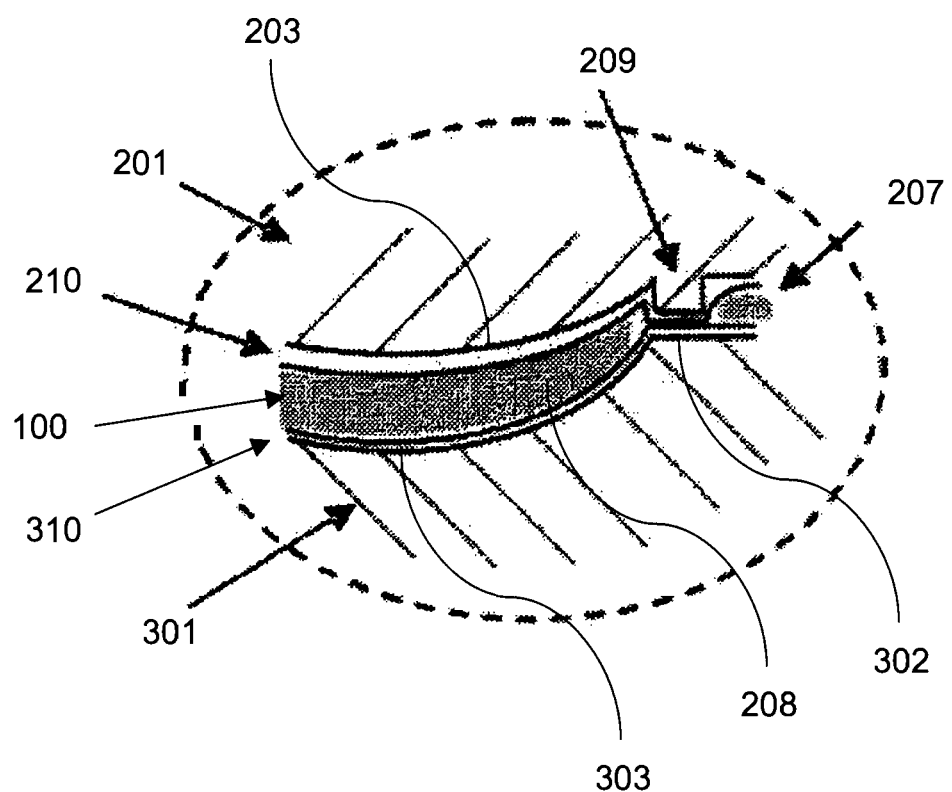
FIG. 22 is a detail of a schematic representation of an embodiment of a mold assembly comprising a pinch-off rim according to a preferred embodiment of the invention.

FIG. 22 shows a detail of a schematic representation of a male mold half 201 comprising a pinch-off rim 209. When said male mold half 201 is combined in a mold assembly with a female mold half 301, the pinch-off rim compresses the two mold release sheets 210 and 310 in the area of the rim and separates the lens forming material into two distinct areas, i.e. the lens forming material in the mold cavity 208 and the excess lens forming material in the overflow 207. The lens forming material in the mold cavity 208 is finally forming the lens 100 between the male lens forming area 203 and the female lens forming area 303, wherein the mold release sheets 210 and 310 are protecting the mold surfaces of the mold halves from contact with the lens forming material.

Figure 23:
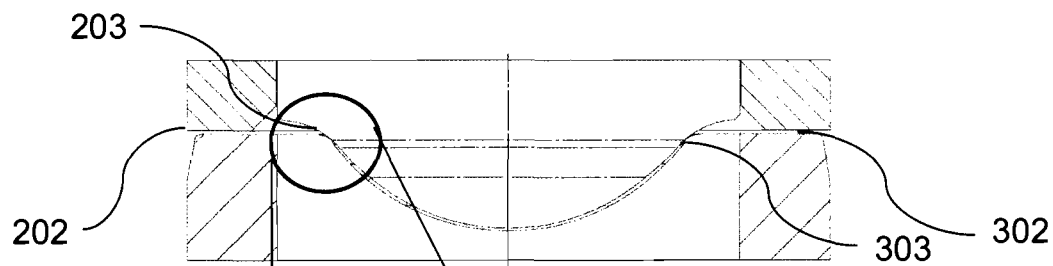
FIG. 23 is an embodiment of a mold assembly with a pinch-off rim according to the invention.

FIG. 23 shows an embodiment of a mold assembly comprising a male mold half with a mold surface 202 and a lens forming area 203 as well as a female mold half with a mold surface 302 and a lens forming area 303.

Figure 24:
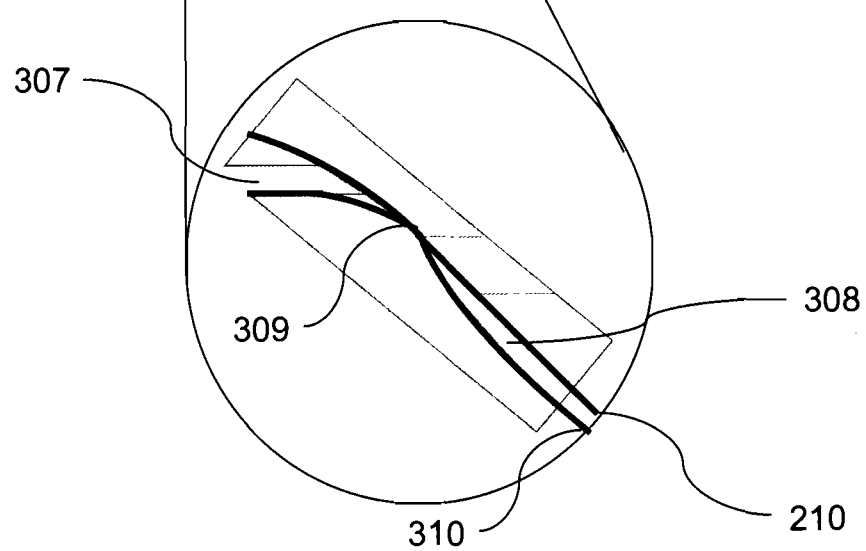
FIG. 24 is a detailed view of the embodiment of FIG. 23.

FIG. 24 shows a detail of FIG. 23. When said male mold half is combined in a mold assembly with a female mold half, the pinch-off rim 309 compresses the two mold release sheets 210 and 310 in the area of the rim and separates the lens forming material into two distinct areas, i.e. the lens forming material in the mold cavity 308 and the excess lens forming material in the overflow 307. The lens forming material in the mold cavity 308 is finally forming the lens between the male lens forming area 203 and the female lens forming area 303, wherein the mold release sheets 210 and 310 are protecting the mold surfaces of the mold halves from contact with the lens forming material.

Figure 25:
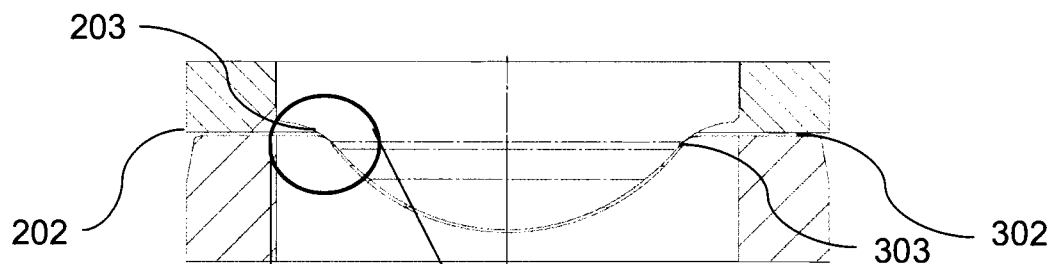
FIG. 25 is another embodiment of a mold assembly with a pinch-off rim according to the invention.

FIG. 25 shows an embodiment of a mold assembly comprising a male mold half with a mold surface 202 and a lens forming area 203 as well as a female mold half with a mold surface 302 and a lens forming area 303.

Figure 26:
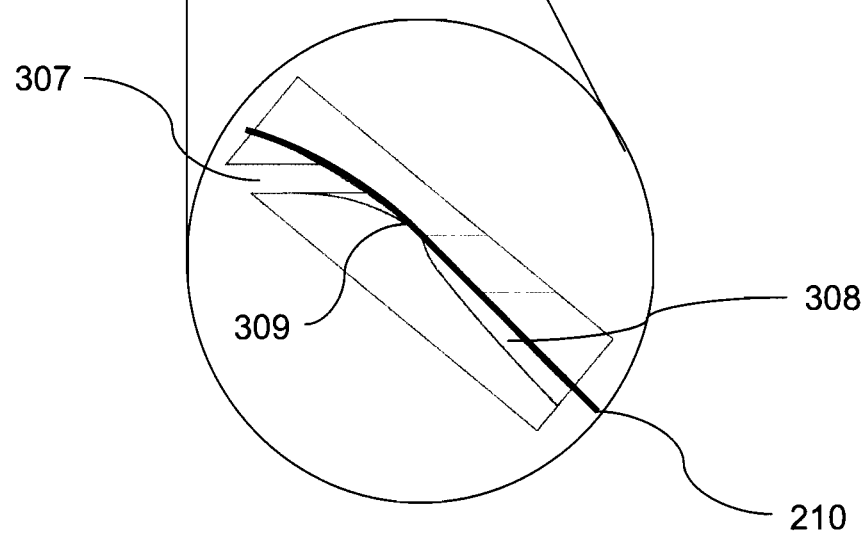
FIG. 26 is a detailed view of the embodiment of FIG. 25.

FIG. 26 shows a detail of FIG. 25. When said male mold half is combined in a mold assembly with a female mold half, the pinch-off rim 309 compresses against the mold release sheet 210 in the area of the rim and separates the lens forming material into two distinct areas, i.e. the lens forming material in the mold cavity 308 and the excess lens forming material in the overflow 307. The lens forming material in the mold cavity 308 is finally forming the lens between the male lens forming area 203 and the female lens forming area 303, wherein the mold release sheet 210 is protecting the mold surface of the male mold half from contact with the lens forming material.

Figure 27:
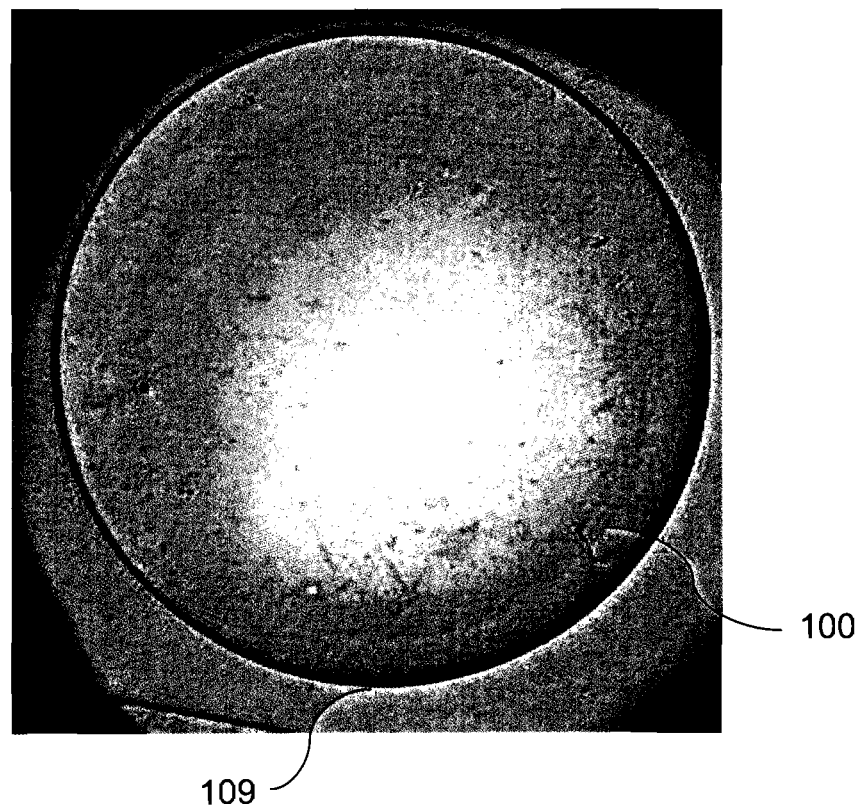
FIG. 27 is an image (Schlieren method) of a contact lens manufactured in a mold assembly of FIG. 25.

FIG. 27 shows a contact lens 100 manufactured in a mold assembly of FIG. 25, wherein a mold release sheet 210 with a thickness of 12 µm was applied to the male mold half. The contact lens edge 109 is formed by the pinch-off rim 309 as described above.

Figure 28:
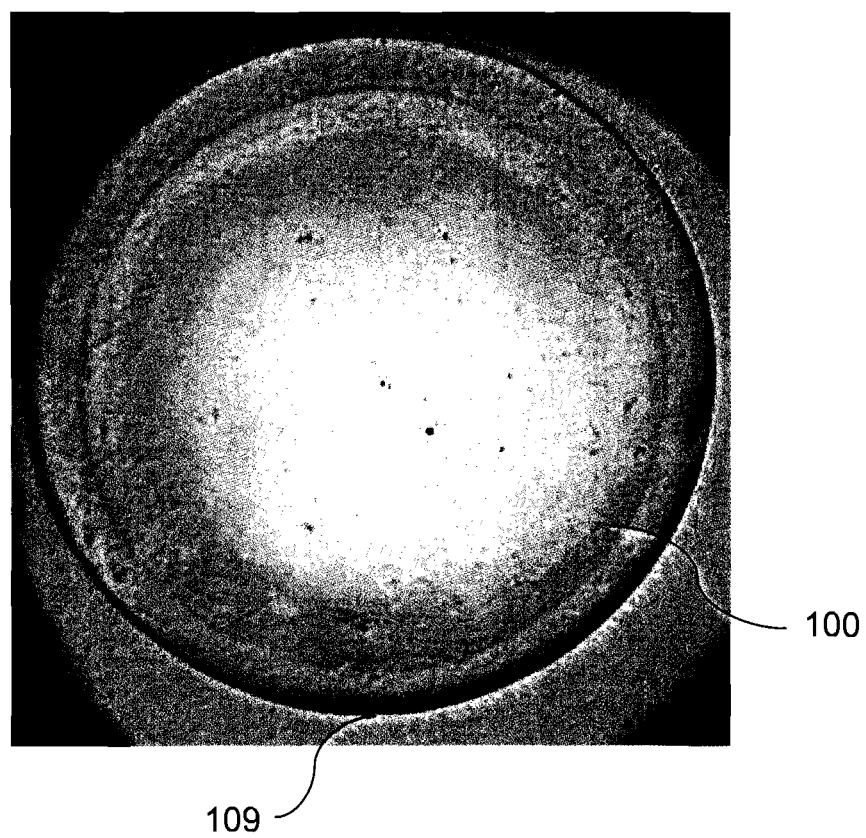
FIG. 28 is an image (Schlieren method) of a contact lens manufactured in a mold assembly comprising a mold half of FIG. 21.

FIG. 28 shows a contact lens 100 manufactured in a mold assembly comprising a mold half of FIG. 21, wherein a mold release sheet 810 with a thickness of 23 µm was applied to the female mold half. The contact lens edge 109 is formed by the pinch-off rim as described above. The image shows no imprint of the vacuum hole 805 centrally arranged in the lens forming area.

Figure 29:
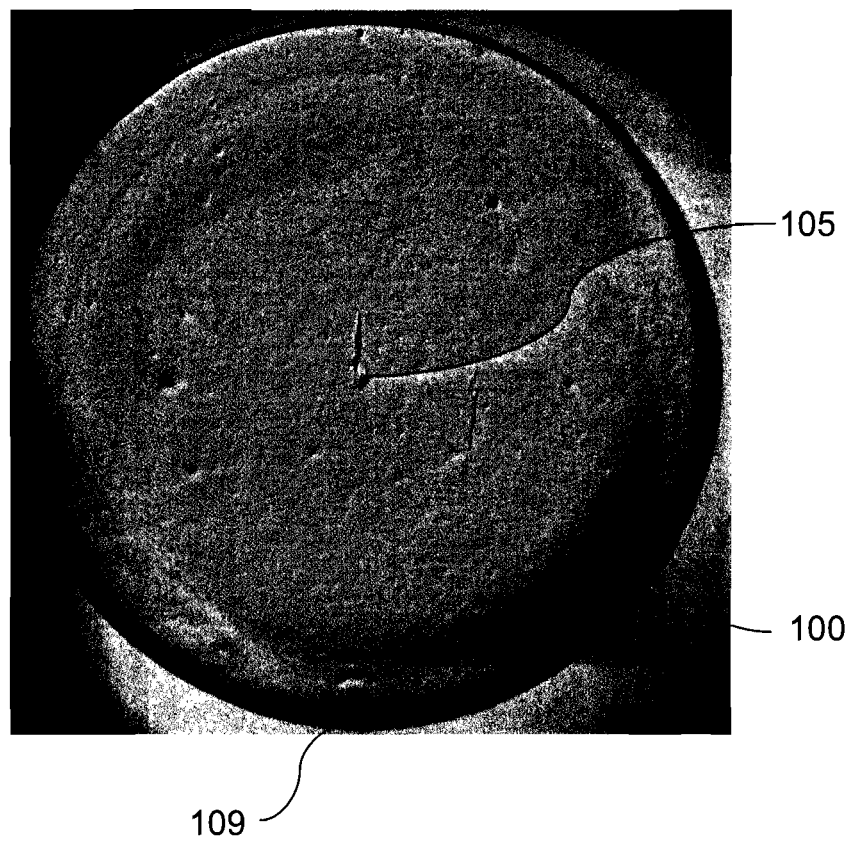
FIG. 29 is an image (Schlieren method) of a contact lens manufactured in a mold assembly of FIG. 23.

FIG. 29 shows a contact lens 100 manufactured in a mold assembly of FIG. 23, wherein a mold release sheet 210 with a thickness of 12 µm was applied to the male mold half and a mold release sheet 310 with a thickness of 23 µm was applied to the female mold half. The contact lens edge 109 is formed by the pinch-off rim 309 as described above. The image shows an imprint 105 of the vacuum hole 805 centrally arranged in the lens forming area.

In one aspect the present invention relates to a mold half for making an ophthalmic lens, in particular a contact lens, comprising a mold surface, a lens forming area and a release sheet removably arranged on the mold surface of said mold half, as well as a vacuum means, wherein the release sheet has a thickness of from 5 to 50 µm, tightly conforms to the contour of at least the lens forming area of said mold half and extends substantially beyond said lens forming area.

The mold half comprises a vacuum means to removably attach said release sheet to said mold surface. The vacuum means in one embodiment preferably comprises at least two vacuum holes circumferentially surrounding the lens forming area. In a more preferred embodiment, the vacuum means comprises 2, 3, 4, 5, 6, 7, 8, 9, 10, 11, or 12 vacuum holes circumferentially surrounding the lens forming area. In a most preferred embodiment, the vacuum means comprises 6, 8, 10, or 12 vacuum holes circumferentially surrounding the lens forming area.

In another preferred embodiment, the at least two vacuum holes or the multitude of vacuum holes as set out above, are replaced by a ring gap circumferentially surrounding the lens forming area, i.e. corresponding to an infinite number of vacuum holes.

In another preferred aspect of the invention a female mold half comprises one vacuum hole centrally arranged in the lens forming area, either as the only vacuum means or in addition to vacuum means described above. In another conceivable embodiment, the female mold half may comprise two or more vacuum holes centrally arranged in the lens forming area. In a preferred embodiment, the vacuum means comprises 2, 3, 4, 5, 6 or 7 vacuum holes centrally arranged in the lens forming area. In a more preferred embodiment, the vacuum means comprises 5, 6, or 7 vacuum holes centrally arranged in the lens forming area.

In still another preferred aspect of the invention a female mold half comprises a porous lens forming area, either as the only vacuum means or in addition to vacuum means described above. Materials used for the porous lens forming area are usually selected from sintered inorganic materials such as metals, alloys, glass or quartz, as well as from sintered organic materials such as sintered organic polymers. Preferably the molds comprise a mold case, which preferably is made of metal, alloys or polymers, as well as a lens forming area, which preferably is made of sintered metal, sintered glass, sintered quartz or sintered polymer.

In a more preferred aspect of the present invention, the mold half further comprises a pinch-off rim for forming the edge of the ophthalmic lens, wherein the pinch-off rim is circumferentially surrounding the lens forming area.

The mold half according to the invention may be either or both of a male mold half having a convex lens forming area or a female mold half having a concave lens forming area.

The release sheet of the present invention preferably is chemically inert to the material forming said ophthalmic lens, is bi-directionally elastic and is transparent to UV radiation. A particularly preferred material is LLDPE (linear low density polyethylene). The thickness of the release sheet preferably is from 10 to 30 µm, and more preferably from 12 to 23 µm.

In another aspect the present invention relates to a mold assembly, for making an ophthalmic lens, comprising a pair of mold halves to form the ophthalmic lens between the lens forming areas of said pair of mold halves, wherein at least one mold half of said pair of mold halves is a mold half as described above, preferably each of the two mold halves (male and female) is a mold half as described above.

In still another aspect the present invention relates to a method for applying a removable mold release sheet to a mold half as described above, comprising the steps of arranging a release sheet close to the mold surface of said mold half; and applying means to conform the release sheet to the contour of at least the lens forming area of said mold half, preferably applying vacuum through vacuum holes circumferentially surrounding said lens forming area and/or wherein the mold half is a female mold half, further or alternatively applying vacuum through a vacuum hole centrally arranged in the lens forming area or through the porous body of the lens forming area.

In yet another aspect a method for applying a removable mold release sheet to a mold half is disclosed, comprising the steps of mechanically pressing the release sheet onto or into the lens forming area with a pad having substantially the shape of the lens forming area and having sufficient elasticity to conform the release sheet to the contour of the lens forming area.

In yet another aspect a method for applying a removable mold release sheet to a mold half is disclosed, comprising the steps of applying a heat stamp or heat source to the release sheet conforming the release sheet to the contour of the lens forming area.

In a preferred embodiment, the mold half and/or the mold-assembly according to the invention comprises a pinch-off rim. The advantage of such an embodiment is the formation of a well defined edge of the ophthalmic lens, in particular the contact lens, molded between the two mold halves. Further, the separation of the lens forming material into two areas, the mold cavity and the overflow, allows that polymerization and/or cross-linking can be limited to the lens forming area, whereas the lens forming material in the overflow can be disposed of easily in liquid form. The mold release sheet of the invention is effectively protecting the mold surface of the mold halves in the lens forming area as well as in the overflow area from contact with the lens forming material at all time.

Materials used for the molds in fully automated, high volume processes for the manufacture of contact lenses are usually selected from inorganic materials such as metals, alloys, glass or quartz, as well as from organic materials such as organic polymers. Preferably the molds comprise a body part, which preferably is made of metal, alloys or polymers, as well as a lens forming area, which preferably is made of glass or quartz. Desired properties for the body part are mechanical stability, resistance to abrasion and corrosion and the like. Desired properties for the lens forming area are a long lasting optical grade surface as well as a high UV transmission for processes using UV cross-linking.

Other contemplated desired surface properties of a contact lens mold are for example hydrophilic or hydrophobic characteristics, specific surface energy characteristics that promote or inhibit wettability and/or adhesion, specific chemical interaction to promote or inhibit transmission of various materials, chemical resistance or inertness characteristics.

In particular in the manufacture of Silicone Hydrogel (SiHy) contact lenses, the adhesion of the polymerized and/or cross-linked lens forming material to the mold is high. This leads to difficulties in opening the molds, releasing the lens from the mold, in handling the lens and in cleaning the molds from excess lens forming material.

It has been found, that applying a (temporary) sheet material with desired surface properties on the lens mold allows for surface properties which are substantially different from the mold material forming the body and or the lens forming area of the mold, without giving away the other advantages of the material forming the body and/or the lens forming area of the mold.

In particular in the manufacture of SiHy contact lenses, applying a (temporary) sheet material on the lens mold, leads to improvements in opening the molds, in releasing the lens from the mold, in handling the lens and in keeping the molds clean from lens forming material.

The (temporary) sheet material may further be subject to pretreatment or modification processes, e.g. by plasma, by chemical vapor deposition, by corona ionization or by flame ionization, to further alter surface properties according to desired characteristics.

Requirements for the release sheet depend on the manufacturing process for the molded article. In the automated manufacture of contact lenses using glass or quartz molds and cross-linking the lens forming material with UV irradiation, the requirements for the release sheet are at least the following:

High UV transmittance at least on the mold half side through which the UV radiation is applied. For example UV transmittance for a mold release sheet with a thickness of 12 μm is 70% or higher, preferably 80% or higher, more preferably 85% or higher.

Smooth surface to not impair the optical surface of the lens forming area and the formed contact lens, respectively; For example the roughness of the surface for a mold release sheet with a thickness of 12 μm is 25 nm or less, preferably 20 nm or less and more preferably 15 nm or less, most preferably 10 nm or less.

High elasticity to conform to the mold surface and to the lens forming area in particular without any breaks, folds or tears; For example the elasticity at break (first and second direction) for a mold release sheet with a thickness of 12 μm is 500% or higher, preferably 700% or higher, most preferably the elasticity at break is at least 600% in the first direction and 900% in the second direction.

Inertness to the reactions of the lens forming material to not impair the polymerization and/or cross-linking of the lens forming material;

Resistance to the UV irradiation at the wavelengths and intensities applied for polymerization and/or cross-linking of the lens forming material;

Limited adhesion to the formed lens and/or to the mold surface after polymerization and/or cross-linking of the lens forming material;

Mechanical stability to the forces exerted through mold opening, mold release, transfer and lens-sheet separation;

Limited swelling in solvents such as Ethanol and Isopropanol.

Suitable materials for the release sheet are organic polymeric materials, in particular alpha-olefins, such as polyethylene (PE), polypropylene (PP), Low density polyethylene (LDPE) and Linear low density polyethylene (LLDPE), as well as fluorinated polyethylenes. A preferred mold release sheet material particularly useful in the present invention is Linear low density polyethylene (LLDPE).

The release sheet preferably has a thickness sufficiently low to conform to the lens forming area in particular without any breaks, folds or tears and, at the same time, sufficiently high to not show any imprint of a porous mold surface or of a central vacuum hole onto the lens surface.

After forming the lens in the mold, the release sheet improves the opening of the mold by reducing the force required to separate the male and female mold half through reduced adhesion of the release sheet to the mold halves compared to the adhesion of the lens material directly contacting the mold halves. The reduced opening forces in a first aspect allow for faster processing, but in a second aspect as well ensure integrity and quality of the lens. In a further aspect, the defined surface properties of the release sheet on the one or the other mold half, allow that the formed contact lens adheres to either the one or the other mold half. For example a release sheet on the male mold half with a lower adhesion to the mold surface will lead to the contact lens finally, i.e. after mold opening, being present in the female mold half (together with the release sheet of the male mold half).

In a further aspect of the invention, the formed contact lens can be removed from the open mold together with the release sheet. For example, the contact lens being present in the female mold half and adhering to the release sheet on the male mold half may be transferred to the next processing step together with said release sheet. In another embodiment wherein a release sheet is on both mold halves, the lens may be transferred in between the two release sheets, the one above and the one below form the male and female mold half respectively.

Accordingly, in a further aspect, the invention is directed to a method for manufacturing a contact lens, comprising the steps of providing a mold for making a contact lens (100) comprising two mold halves, a female and a male mold half, each comprising a mold surface (202, 302, 602, 702, 802) and a lens forming area (203, 303, 603, 703, 803); removably arranging a release sheet (210, 310, 610, 710, 810) on either of the two mold surfaces (202, 302, 602, 702, 802), wherein the release sheet has a thickness of from 5 to 50 μm and tightly conforms to the contours of the lens forming area of the respective mold half and extends substantially beyond said lens forming area; introducing a flowable lens forming material into the female mold half; closing the mold by putting the male mold half into place; polymerizing and/or cross-linking the lens forming material by means of irradiation with UV light and/or by heating; opening the mold halves; removing the cured contact lens from the open mold together with the release sheet, wherein the contact lens preferably is transferred attached to the release sheet.

In a preferred aspect, the invention is further directed to a method for manufacturing a contact lens, comprising the steps of providing a mold for making a contact lens (100), comprising two mold halves, a female and a male mold half, each comprising a mold surface (202, 302, 602, 702, 802) and a lens forming area (203, 303, 603, 703, 803); removably arranging a release sheet (210, 310, 610, 710, 810) on each of the two mold surfaces (202, 302, 602, 702, 802), wherein each release sheet has a thickness of from 5 to 50 μm, tightly conforms to the contours of the lens forming area of each mold half and extends substantially beyond said lens forming area; introducing a flowable lens forming material into the female mold half; closing the mold by putting the male mold half into place; polymerizing and/or cross-linking the lens forming material by means of irradiation with UV light and/or by heating; opening the mold halves; removing the cured contact lens from the open mold together with the release sheets, wherein the contact lens preferably is transferred in between the two release sheets, the one release sheet of the male mold half above the contact lens and the other release sheet form the female mold half below the contact lens.

Releasing and transferring the lens from the mold in manufacturing processes usually involves the use of solvents, such as water or organic solvents. Releasing and transferring the lens from the mold with the release sheet allows processing without the use of solvents. Without the use of solvents many other problems, such as corrosion and/or cleaning and drying of the molds can be reduced or avoided.

For separating the formed contact lens form the release sheet, there are several conceivable methods:
One method can be described as peeling the release sheet from the lens. Another method can be described as first swelling the release sheet and/or the contact lens in an appropriate solvent and then peeling the release sheet from the lens. In another method the release sheet is washed from the contact lens with or without swelling the sheet and/or the lens in a solvent. In a preferred method, the separation of the release sheet form the contact lens can be combined with other processing steps, such as swelling, extraction, hydration, and the like.

EXAMPLES

Comparative Example 1

1 drop of Ethanol is applied to the quartz surface of a male mold half according to FIG. 18, as well as on the glass mold surface of a conventional female mold half. Both surfaces are dried with air and moisturized.

42 mg of Nelfilcon (PVA based lens forming material available from CIBA Vision GmbH, Grosswallstadt, Germany) are dosed into the female mold half. The male mold half is centered over the female mold half and the mold assembly is closed in a closing tool. Both mold halves together comprise a pinch off rim for defining the contact lens edge similar to the one in FIGS. 25 and 26, but without the release sheet.

The lens forming material is cured under UV light (applied through the male mold half) at 8 mW/cm$^2$ for 4.0 seconds. The mold is opened and the formed contact lens is removed from the female mold half of the mold assembly.

Results (Average of 5 Lenses):

| | |
|---|---|
| Center thickness of the lens: | 91 μm (Target: 100 μm) |
| Diameter of the lens: | 14.1 mm (Target: 14.1 mm) |
| Diopter: | −1.75 (Target: −1.75) |

Example 2

Preparation of the Male Mold Half

To a male mold half according to FIG. 12, a release sheet is applied as follows: The quartz mold surface is moisturized, the release sheet (Film A, Table 1) is arranged above the mold surface and the clamping ring is fixed. Then vacuum (pressure range of 180 to 350 mbar) is slowly applied through the vacuum line to the vacuum holes, removably attaching the release sheet to the mold surface, in particular the lens forming area, thereby stretching the release sheet to conform to the convex shape of the male lens forming area.

Dosing and Mold Assembly 1 drop of Ethanol is applied to the release sheet on the male mold half, as well as on the glass mold surface of a female mold half comprising a pinch off rim according to FIGS. 25 and 26 for defining the contact lens edge. Both surfaces are dried with air and moisturized. 42 mg of Nelfilcon are dosed into the female mold half. The male mold half is centered over the female mold half and the mold assembly is closed in a closing tool.

Curing and Mold Opening

The lens forming material is cured under UV light (applied through the male mold half) at 8 mW/cm$^2$ for 4.0 seconds. The mold is opened and the formed contact lens is removed from the male mold half of the mold assembly together with the release sheet. The release sheet is peeled from the lens.

Results (Average for 10 Lenses):

| | |
|---|---|
| Center thickness of the lens: | 84 μm (Target: 100 μm) |
| Diameter of the lens: | 14.1 mm (Target: 14.1 mm) |
| Diopter: | −1.75 (Target: −1.75) |

One resulting lens is shown as an image (Schlieren method) in FIG. 27.

Example 3

Preparation of the Female Mold Half

The lens forming area of the female mold half is made of microporous polyethylene with a pore size of 10 μm (which is

TABLE 1

Properties of selected film materials

| | Thickness [μm] | Fmax [N] | σ [N/mm$^2$] | ε [mm] | ε [%] | F at break ε = 100% [N] | σ at ε = 100% [N/mm$^2$] | Transmission T at 305 nm [%] | Roughness top side [nm] | Roughness bottom side [nm] |
|---|---|---|---|---|---|---|---|---|---|---|
| Film A[1] (transverse direction) | 12 | 5.5 | 30.8 | 495 | 990 | 1.9 | 10.4 | 83.9 | 23.7 | 25.8 |
| Film A (longitudinal direction) | | 8.6 | 47.8 | 322 | 640 | 3.0 | 16.4 | | | |
| Film B[2] (transverse direction) | 23 | 9.7 | 28.1 | 515 | 1030 | 3.3 | 9.7 | 71.5 | 22.7 | 19.7 |
| Film B (longitudinal direction) | | 16.1 | 46.8 | 407 | 814 | 5.9 | 17.1 | | | |

[1]LLDPE film; Duolen ® stretchfilm Duo Premium (commercially available from Duo Plast AG, Lauterbach, Germany)
[2]LLDPE film; BPI handfilms (commercially available from BPI.film, Great Britain)

commercially available as Poroplast from Durst Filtertechnik GmbH, Besigheim-Ottmarsheim, Germany). To a female mold half according to FIG. 8, a release sheet is applied as follows: The microporous polyethylene surface is moisturized, the release sheet (Film B, Table 1) is arranged above the mold surface. Then vacuum (first pressure range of 80 to 85 mbar and second pressure range of 400 to 425 mbar) is slowly applied through the vacuum line, removably attaching the release sheet to the mold surface, in particular the lens forming area, thereby stretching the release sheet to conform to the concave shape of the female lens forming area.

Dosing and Mold Assembly 1 drop of Ethanol is applied to the quartz surface of the male mold half, as well as to the release sheet on the female mold half. Both surfaces are dried with air and moisturized.

42 mg of Nelfilcon are dosed into the female mold half. The male mold half is centered over the female mold half and the mold assembly is closed in a closing tool.

Curing and Mold Opening

The male mold half comprises a chromium mask for defining the contact lens edge by spatial limitation of the UV light (as disclosed for example in EP-B-0637490). The lens forming material is cured under UV light (applied through the male mold half) at 8 mW/cm$^2$ for 4.0 seconds. The mold is opened and the formed contact lens is removed from the male mold half of the mold assembly. Where necessary, the release sheet is peeled from the lens.

Results (Average for 10 Lenses):

| | |
|---|---|
| Center thickness of the lens: (only measured for 2 lenses with release sheet removably attached at "lower vacuum", i.e. in second pressure range of 400-425 mbar): | 70 and 73 µm (Target: 100 µm) |
| Diameter of the lens: | 14.0 mm (Target: 14.1 mm) |
| Diopter: | n/a (Target: −0.50) |

All 10 lenses show an imprint of the microporous surface structure of the female mold half, in the phase contrast image (Schlieren method). If a "lower vacuum" (second pressure range of 400 to 425 mbar) is applied, the imprint can be reduced, but not entirely avoided.

The lens edge of all 10 lenses was defective, i.e. not clearly defined. It appears, that the microporous surface structure of the female mold half leads to reflexion and scattering of the UV light, resulting in (partial) curing of the lens material in the area covered by the chromium mask.

Example 4

Preparation of the Female Mold Half

To a female mold half according to FIG. 16 a release sheet is applied as follows: The glass mold surface is moisturized, the release sheet (Film B, Table 1) is arranged above the mold surface and the clamping ring is fixed. Then vacuum (pressure range of 110 to 170 mbar) is slowly applied through the vacuum line to the vacuum hole in the center (diameter of the hole: 0.25 mm), removably attaching the release sheet to the mold surface, in particular the lens forming area, thereby stretching the release sheet to conform to the concave shape of the female lens forming area.

Dosing and Mold Assembly 1 drop of Ethanol is applied to the quartz surface of the male mold half, as well as to the release sheet on the female mold half. Both surfaces are dried with air and moisturized.

42 mg of Nelfilcon are dosed into the female mold half. The male mold half is centered over the female mold half and the mold assembly is closed in a closing tool.

Curing and Mold Opening

The male mold half comprises a chromium mask for defining the contact lens edge by spatial limitation of the UV light (for example as disclosed in EP-B-0637490). The lens forming material is cured under UV light (applied through the male mold half) at 8 mW/cm$^2$ for 4.0 seconds. The mold is opened and the formed contact lens is removed from the male mold half of the mold assembly. Where necessary, the release sheet is peeled from the lens.

Results (Average for 10 Lenses):

| | |
|---|---|
| Center thickness of the lens: | 97 µm (Target: 100 µm) |
| Diameter of the lens: | 14.1 mm (Target: 14.1 mm) |
| Diopter: | −3.50 (Target: −1.75) |

All 10 lenses show no imprint of the central vacuum hole. One resulting lens is shown as an image (Schlieren method) in FIG. 28

The roughness of the lens surface was determined for two lenses and showed (at average) a roughness of 23 nm on the side of the female mold release sheet, compared to 12 nm on the side of the male quartz mold. The roughness on the side of the female mold half corresponds to the roughness of the mold release sheet.

Example 5

Preparation of the Male Mold Half

To a male mold half according to FIG. 12 a release sheet is applied as follows: The quartz mold surface is moisturized, the release sheet (Film A, Table 1) is arranged above the mold surface and the clamping ring is fixed. Then vacuum (pressure range of 180 to 350 mbar) is slowly applied through the vacuum line to the vacuum holes, removably attaching the release sheet to the mold surface, in particular the lens forming area, thereby stretching the release sheet to conform to the convex shape of the male lens forming area.

Preparation of the Female Mold Half

To a female mold half according to FIG. 16 comprising a pinch off rim according to FIGS. 23 and 24 for defining the contact lens edge, a release sheet is applied as follows: The glass mold surface is moisturized, the release sheet (Film B, Table 1) is arranged above the mold surface and the clamping ring is fixed. Then vacuum (pressure range of 70 to 150 mbar) is slowly applied through the vacuum line to the vacuum hole in the center (diameter of the hole: 0.25 mm), removably attaching the release sheet to the mold surface, in particular the lens forming area, thereby stretching the release sheet to conform to the concave shape of the female lens forming area.

Dosing and Mold Assembly 1 drop of Ethanol is applied to the release sheet on the male mold half, as well as to the release sheet on the female mold half. Both surfaces are dried with air and moisturized.

42 mg of Nelfilcon are dosed into the female mold half. The male mold half is centered over the female mold half and the mold assembly is closed in a closing tool.

Curing and Mold Opening

The lens forming material is cured under UV light (applied through the male mold half) at 8 mW/cm$^2$ for 4.0 seconds. The mold is opened and the formed contact lens is removed from the mold halves of the mold assembly together with the release sheets. The release sheets are peeled from the lens.

Results (Average for 10 Lenses):

| | |
|---|---|
| Center thickness of the lens: | 92 μm (Target: 100 μm) |
| Diameter of the lens: | 14.0 mm (Target: 14.1 mm) |
| Diopter: | −1.75 (Target: −1.75) |

All lenses show an imprint of the central vacuum hole in the female mold half.

One resulting lens is shown as an image (Schlieren method) in FIG. 29.

Said lens has been tested on the eye and showed good overall optical quality as well as good wearing comfort at the same level as commercially available PVA (Nelfilcon) based contact lenses (i.e. "Dailies" available from Ciba Vision GmbH, Grosswallstadt, Germany). The imprint however remained visible on eye when viewed with a slit lamp.

The invention claimed is:

1. A mold half, for making an ophthalmic lens, comprising a mold surface, a lens forming area and a release sheet removably arranged on the mold surface of said mold half, characterized in that the release sheet has a thickness of from 5 to 50 μm, tightly conforms to the contour of at least the lens forming area of said mold half and extends substantially beyond said lens forming area, wherein said mold half comprises vacuum means to removably attach said release sheet to said mold surface.

2. A mold half according to claim 1, further comprising a pinch-off rim for forming the edge of the ophthalmic lens, circumferentially surrounding the lens forming area.

3. A mold half according to claim 1 wherein the mold half is a male mold half having a convex lens forming area.

4. A mold half according to claim 1 wherein the mold half is a female mold half having a concave lens forming area.

5. A mold half according to claim 1 comprising a vacuum means comprising at least two vacuum holes circumferentially surrounding the lens forming area.

6. A mold half according to claim 1 comprising a vacuum means comprising one vacuum hole centrally arranged in the lens forming area.

7. A mold half according to claim 4, comprising a vacuum means comprising a porous lens forming area.

8. A mold half according to claim 1 wherein the release sheet is chemically inert to the material forming said ophthalmic lens, is bi-directionally elastic and is transparent to UV radiation.

9. A mold half according to claim 1 wherein the release sheet material is LLDPE (linear low density polyethylene).

10. A mold half according to claim 1 wherein the release sheet has a thickness of from 10 to 30 μm.

11. A mold assembly, for making an ophthalmic lens, comprising
a pair of mold halves, a female and a male mold half, to form the ophthalmic lens between the lens forming areas of said pair of mold halves;
wherein at least one mold half of said pair of mold halves is a mold half according to claim 1.

12. The mold assembly according to claim 11, comprising a pair of mold halves, wherein each of the two mold halves is a mold half comprising a mold surface, a lens forming area and a release sheet removably arranged on the mold surface of said mold half, characterized in that the release sheet has a thickness of from 5 to 50 μm, tightly conforms to the contour of at least the lens forming area of said mold half and extends substantially beyond said lens forming area, wherein said mold half comprises vacuum means to removably attach said release sheet to said mold surface.

* * * * *